United States Patent
Gujarathi

(10) Patent No.: US 11,586,434 B2
(45) Date of Patent: *Feb. 21, 2023

(54) SELECTING A VERSION OF AN APPLICATION

(71) Applicant: Citrix Systems, Inc., Fort Lauderdale, FL (US)

(72) Inventor: Ashish Gujarathi, Parkland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,715

(22) Filed: Jun. 18, 2021

(65) Prior Publication Data

US 2021/0334091 A1    Oct. 28, 2021

Related U.S. Application Data

(63) Continuation of application No. 16/859,614, filed on Apr. 27, 2020, now Pat. No. 11,061,667.

(51) Int. Cl.
| | |
|---|---|
| *G06F 8/71* | (2018.01) |
| *G06F 16/955* | (2019.01) |
| *H04L 67/10* | (2022.01) |
| *H04L 67/00* | (2022.01) |
| *H04L 67/63* | (2022.01) |

(52) U.S. Cl.
CPC ............. *G06F 8/71* (2013.01); *G06F 16/955* (2019.01); *H04L 67/10* (2013.01); *H04L 67/34* (2013.01); *H04L 67/63* (2022.05)

(58) Field of Classification Search
None
See application file for complete search history.

(56) References Cited

U.S. PATENT DOCUMENTS

| | | | |
|---|---|---|---|
| 8,131,875 B1 * | 3/2012 | Chen | H04N 21/25825 715/744 |
| 8,707,289 B2 | 4/2014 | Firman et al. | |
| 8,972,485 B1 * | 3/2015 | French | G06F 9/5044 709/203 |
| 8,990,637 B1 | 3/2015 | Vlachogiannis et al. | |
| 8,997,081 B1 | 3/2015 | Manion et al. | |
| 9,959,360 B2 | 5/2018 | Shapira et al. | |
| 11,061,667 B1 * | 7/2021 | Gujarathi | H04L 67/34 |
| 2004/0181779 A1 | 9/2004 | Gorti | |
| 2009/0044146 A1 | 2/2009 | Patel et al. | |

(Continued)

OTHER PUBLICATIONS

International Search Report and Written Opinion for International Appl. No. PCT/US2021/028505 dated Jun. 25, 2021.

(Continued)

*Primary Examiner* — Marina Lee

(57) ABSTRACT

Described embodiments provide systems and methods for selecting a version of an application to launch for a client device according to a context of the client device. A computing device can receive a request from a client device to launch an application. The request can include an identifier that indicates multiple versions of the application are accessible in which to launch the application. The computing device can select, using the identifier, a version of the application according to a context of the client device. The computing device can provide the client device with access to the selected version of the application, so as to enable the client device to launch a version of the application compatible with the context of the client device.

20 Claims, 7 Drawing Sheets

(56) References Cited

U.S. PATENT DOCUMENTS

| | | |
|---|---|---|
| 2011/0313853 A1 | 12/2011 | Ramer et al. |
| 2013/0024851 A1 | 1/2013 | Firman et al. |
| 2014/0244708 A1* | 8/2014 | Taine ................... G06F 21/629 709/201 |
| 2014/0245376 A1* | 8/2014 | Hibbert ................ G06F 21/577 726/1 |
| 2014/0250106 A1 | 9/2014 | Shapira et al. |
| 2016/0283497 A1 | 9/2016 | Singh |
| 2018/0024832 A1* | 1/2018 | Dang ........................ G06F 8/71 717/104 |
| 2022/0343351 A1* | 10/2022 | Heinrich ................ G06F 21/31 |

OTHER PUBLICATIONS

Notice of Allowance issued in U.S. Appl. No. 16/859,614, dated Mar. 24, 2021.

\* cited by examiner

SELECTING A VERSION OF AN APPLICATION

CROSS-REFERENCE TO RELATED APPLICATION

This application is a continuation of and claims priority to and the benefit of U.S. patent application Ser. No. 16/859,614, titled "SELECTING A VERSION OF AN APPLICATION," filed on Apr. 27, 2020, and issued as U.S. Pat. No. 11,061,667 on Jul. 13, 2021, the contents of all of which are hereby incorporated herein by reference in its entirety for all purposes.

BACKGROUND

In network environments, users can access a plurality of resources or applications through a server to complete various tasks or assignments. For example, the resources or applications can include third party resources or applications provided by one or more third party servers. The server can establish one or more connections to the third party servers to provide the access the plurality of resources and applications and for the user to complete the various tasks or assignments.

SUMMARY

Systems and method for selecting a version of an application to launch for a client device according to a context of the client device and one or more attributes of an application are provided herein. A device can identify different versions (e.g., flavors, forms) of an application available or accessible to a user of a client device and aggregate the different versions. For example, the device can aggregate the different version by applying a tag (e.g., aggregation tag) or identifier to each of the different versions such that the versions are associated with or linked with a single icon (e.g., aggregated icon). The device can provide the icon or a plurality of icons (e.g., plurality of aggregated icons) to the user, for example, in response to the user activating a client application on the client device. The user can select an application by interacting with at least one aggregated icon provided to the user through the client device. The device can, responsive to the icon selection, identify and determine a version of the application to provide to the user based in part on a context of the user (e.g., location, device), context of a client device, and/or attributes of the selected application.

In at least one aspect, a method is provided. The method can include receiving, by a computing device, a request from a client device to launch an application. The request can include an identifier that indicates multiple versions of the application are accessible in which to launch the application. The method can include selecting, by the computing device using the identifier, a version of the application according to a context of the client device. The method can include providing, by the computing device, the client device with access to the selected version of the application, so as to enable the client device to launch a version of the application compatible with the context of the client device.

The plurality of versions of the application include one of: a hosted application, a Software as a Service (SaaS) application or a native application of the client device. The method can include generating, by the computing device, a score for individual versions of the plurality of versions based on a comparison of attributes of the plurality of versions of the application, the score indicative of a similarity between the plurality of versions. The method can include applying, by the computing device, the identifier to the multiple versions of the plurality of versions of the application having a score greater than a threshold level. The method can include aggregating, by the computing device, the multiple versions having the identifier with an icon to provide the icon to the client device for requesting the application.

The method can include comparing, by the computing device, the context of the client device to one or more attributes of the application. The context of the client device can include one of: a location of the client device, a type of client device, or a time of day. The method can include generating, by the computing device responsive to the comparison, a score for the client device to access individual versions of the plurality of versions of the application. The score can indicate a risk associated with accessing the respective version of the application from the client device. The method can include selecting, by the computing device using the score, the version of the application from the plurality of versions in which to launch the application.

In embodiments, the method can include selecting, by the computing device according to a determined order of access for the plurality of versions, the version of the application from the plurality of versions. The method can include providing, by the computing device, the computing device with a uniform resource locator (URL) of the selected version of the application, so as to enable the client device to launch the version of the application compatible with the context. The method can include providing, by the computing device, an indication to the client device indicating one or more criteria used in the selection of the version of the application.

In at least one aspect, a system is provided. The system can include a computing device comprising one or more processors coupled to memory. The computing device can be configured to receive a request from a client device to launch an application. The request can include an identifier that indicates multiple versions of the application are accessible in which to launch the application. The computing device can be configured to select, using the identifier, a version of the application according to a context of the client device. The computing device can be configured to provide the client device with access to the selected version of the application, so as to enable the client device to launch a version of the application compatible with the context of the client device.

The plurality of versions of the application can include one of: a hosted application, a Software as a Service (SaaS) application or a native application of the client device. The computing device can be configured to generate a score for individual versions of the plurality of versions based on a comparison of attributes of the plurality of versions of the application. The score can be indicative of a similarity between the plurality of versions. The computing device can be configured to apply the identifier to the multiple versions of the plurality of versions of the application having a score greater than a threshold level. The computing device can be configured to aggregate the multiple versions having the identifier with an icon to provide the icon to the client device for requesting the application.

In embodiments, the computing device can be configured to compare the context of the client device to one or more attributes of the application. The context of the client device can include one of: a location of the client device, a type of client device, or a time of day. The computing device can be configured to generate, responsive to the comparison, a score for the client device to access individual versions of the plurality of versions of the application. The score can indicate a risk associated with accessing the respective version of the application from the client device. The computing device can be configured to select, using the score, the version of the application from the plurality of versions in which to launch the application. The computing device can be configured to provide the client device with a uniform resource locator (URL) of the selected version of the application, so as to enable the client device to launch the version of the application compatible with the context.

In at least one aspect, a non-transitory computer-readable medium is provided. The non-transitory computer-readable medium can include instructions that, when executed by the processor of a device, cause the processor to receive a request from a client device to launch an application. The request can include an identifier that indicates multiple versions of the application are accessible in which to launch the application. The non-transitory computer-readable medium can include instructions that, when executed by the processor of a device, cause the processor to select, using the identifier, a version of the application according to a context of the client device. The non-transitory computer-readable medium can include instructions that, when executed by the processor of a device, cause the processor to provide the client device with access to the selected version of the application, so as to enable the client device to launch a version of the application compatible with the context of the client device.

In embodiments, the non-transitory computer-readable medium can include instructions that, when executed by the processor of a device, cause the processor to apply the identifier to the multiple versions of the plurality of versions of the application having a score greater than a threshold level. The non-transitory computer-readable medium can include instructions that, when executed by the processor of a device, cause the processor to aggregate the multiple versions having the identifier with an icon to provide the icon to the client device for requesting the application.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 4A:
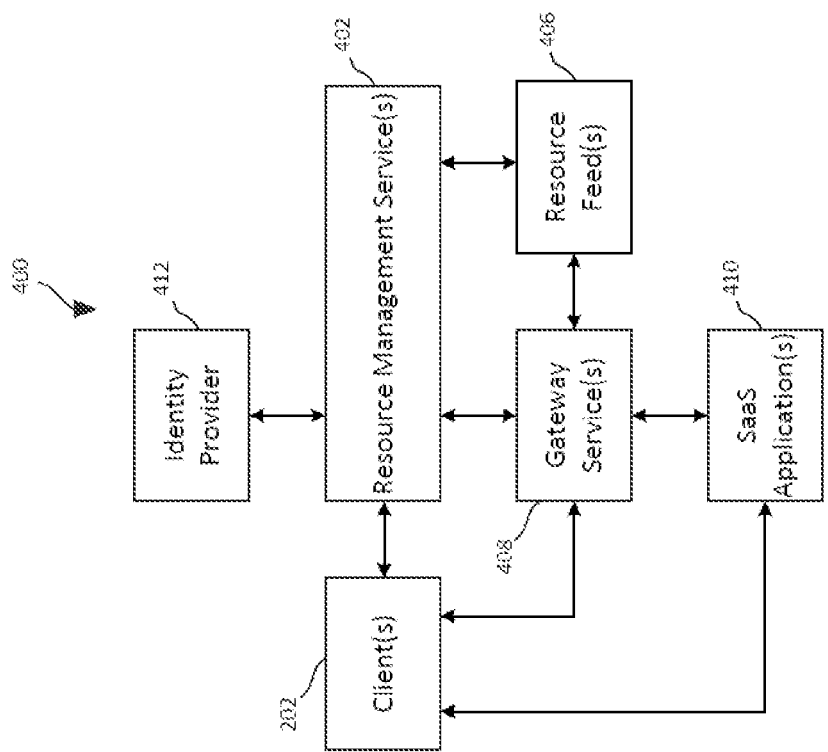
FIG. 4A is a block diagram of an example system in which resource management services may manage and streamline access by clients to resource feeds (via one or more gateway services) and/or software-as-a-service (SaaS) applications.
Figure 4B:
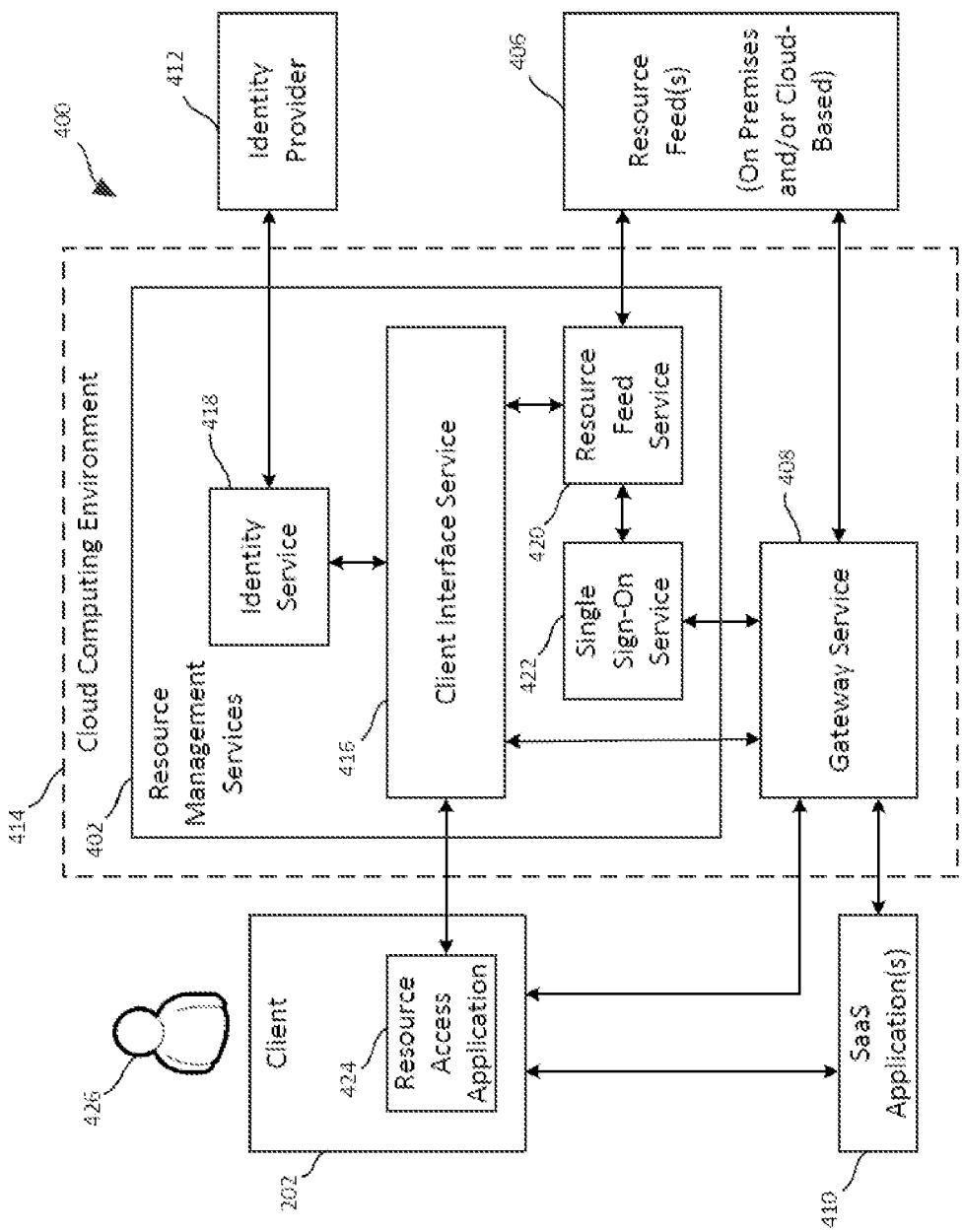
Figure 4C:
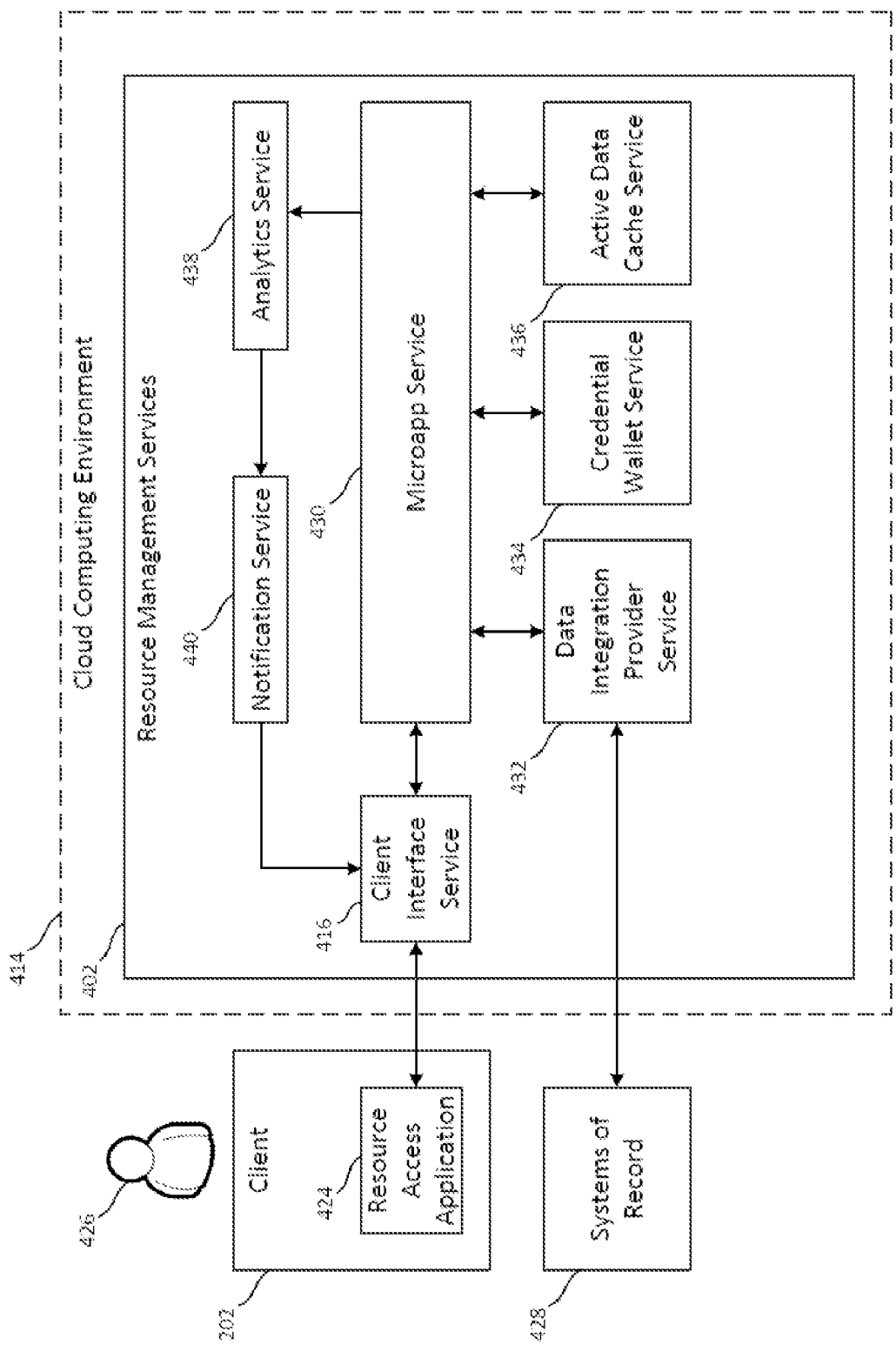

FIG. 4B is a block diagram showing an example implementation of the system shown in FIG. 4A in which various resource management services as well as a gateway service are located within a cloud computing environment; and FIG. 4C is a block diagram similar to that shown in FIG. 4B but in which the available resources are represented by a single box labeled "systems of record," and further in which several different services are included among the resource management services.

DETAILED DESCRIPTION

Systems and method for selecting a version of an application are provided herein. Organizations, networks or companies can provide a plurality of users access to different applications (e.g., resources, applications, desktops and files) hosted in a cloud environment, locally on a client device or other network accessible by users of the respective organization from different client devices. For example, a device (e.g., control device, administrator device) can provide icons for the applications to a user through a client application executing on the client device such that the user can click on or otherwise interact with the icon to launch the respective application. However, the applications can include different versions or different flavors with each version or flavor of the application having different access constraints and/or properties based in part a location the application is accessed from, the device properties the access request is received from and/or a user requesting access. Thus, an end user can have access to multiple versions of the same application and be provided a plurality of icons for the same application with each icon representing a different version. For example, a user accessing a work desktop through a client device may be provided with a first icon for a first version (e.g., local to client device) of a word processing application, a second icon for a hosted version of the word processing application, and a third icon for a Software as a Service version(SaaS) of the word processing application. The client device desktop view can be cluttered with multiple icons for multiple applications available to the user. Further, the user may have to determine, prior to making a selection, which version to select or the user can continually try to access different versions of an application until the correct or appropriate version is selected. For example, the user may select an incorrect version and receive a message from the client device indicating that the selected version cannot be provided due to one or more security rules associated with the selected version of the application (e.g., client device outside approved geo-location) or the selected version cannot be accessed from the respective client device.

Systems and methods are provided herein for aggregating multiple versions of a common application to provide to a user a single common icon associated with the different versions of the application. A device can receive a selection from the user through the common icon and identify at least one version of the application to provide the user based in part on a context of the user, context of a client device and attributes of an application. The device can identify one or more versions of an application available or accessible to the user. For example, the device can identify client devices, desktops (e.g., remote desktops, hosted desktops, local desktops) and/or a user profile for the user and determine the different versions of applications available to the user.

In embodiments, the device can compare attributes and/or properties of the different versions to aggregate multiple versions together. The device can determine that versions of an application having a determined number of attributes in common (e.g., greater than a threshold level) are the same or similar and aggregate the versions. The device can apply a tag (e.g., aggregation tag, identifier) to the versions that corresponds to or is linked with a common icon such that individual the versions are aggregated with or associated with a single icon presentable to the user within an interface of the client device. The device can provide the user a common icon or a plurality of common icons corresponding to a plurality of icons to reduce overall number of icons displayed to a user through a client device and enable selection of the proper version of an application for a given context of the user or particular client or end-user device.

The device can receive a selection of a common icon for an application and determine which version of the application to provide to the user such that the user does not have to provide any further input to identify the correct or appropriate version of the selected application. For example, responsive to the user selecting a common icon (e.g., aggregated icon), the device can determine a context of the user, a context of a client device and/or one or more attributes of an application. The context of the user and/or client device can include, but not limited to, a location of the user and/or client device (e.g., home, work, geo-fence boundary), properties of a connection of the client device to a network (e.g., work network, private network, public network), a time of day (e.g., approved time, work time, off hours), a user's risk score and/or properties of the client device. The attributes (e.g., access rules) for the application can include restrictions on types of users, restrictions on types of devices, restrictions on access times, and/or restrictions based in part on connection properties. The device can execute one or more access algorithms to compare and/or analyze the context of the user and/or client device in view of the attributes of the application. The device can, using the access algorithms, generate a score value for a user or client device to access individual versions of the application associated with the selected common icon.

In embodiments, the device can select a version of the application to provide or launch for the user based in part on the generated score value for a user and/or client device. The device can determine whether to allow/provide access to a version of an application or deny/prevent access to one or more versions of an application based in part on the context of the user and/or the client device and/or the attributes of the application. For example, in some embodiments, a user may be prevented from accessing a hosted version of an application or a SaaS version of an application if the client device of the user is outside a geo-fence boundary (e.g., corporate network boundary, private network boundary) established to access the hosted version of an application and/or the SaaS version of an application. In some embodiments, the device can provide access to a restricted version and modify a level of access to the version of the application based in part on the context of the user and/or client device and/or the attributes of the application. For example, the device can provide modified access to a hosted application through modified data loss prevention (DLP) controls applied to the hosted version of the application when the user requests access to the hosted application from a client device outside the outside the geo-fence boundary established to access the hosted version of the application. The device can provide the user with a local version (e.g., local to the client device) of the application on the client device in response to the user being outside the geo-fence boundary established to access the other versions of the application. In embodiments, the device can provide a notification or alert to the user to indicate to the user the specific version of the application being provided and a reason or decision as to why the user was provided the specific version of the application (e.g., based on a current location, based on an access rule). In some embodiments, the different versions can be provided to a user in a determined order (e.g., administrator determined order).

Thus, the device can determine the correct or appropriate version of an application for a user and solve the problem of providing contextual security access controls to a plurality of different versions of applications that can be accessible by a user. For example, the device can dynamically apply security access controls and determinations based in part on a determined context of the respective user. The device can identify and launch the correct version of the application and provide increased security, for example, for hosted versions or work specific versions of applications having sensitive content.

Section A describes a computing environment which may be useful for practicing embodiments described herein; and Section B describes methods and systems for selecting a version of an application according to a context of a user and one or more attributes of a client device.

A. Computing Environment

Prior to discussing the specifics of embodiments of the systems and methods of for securing offline data (e.g., browser offline data) for shared accounts, it may be helpful to discuss the computing environments in which such embodiments may be deployed.

Figure 1A:
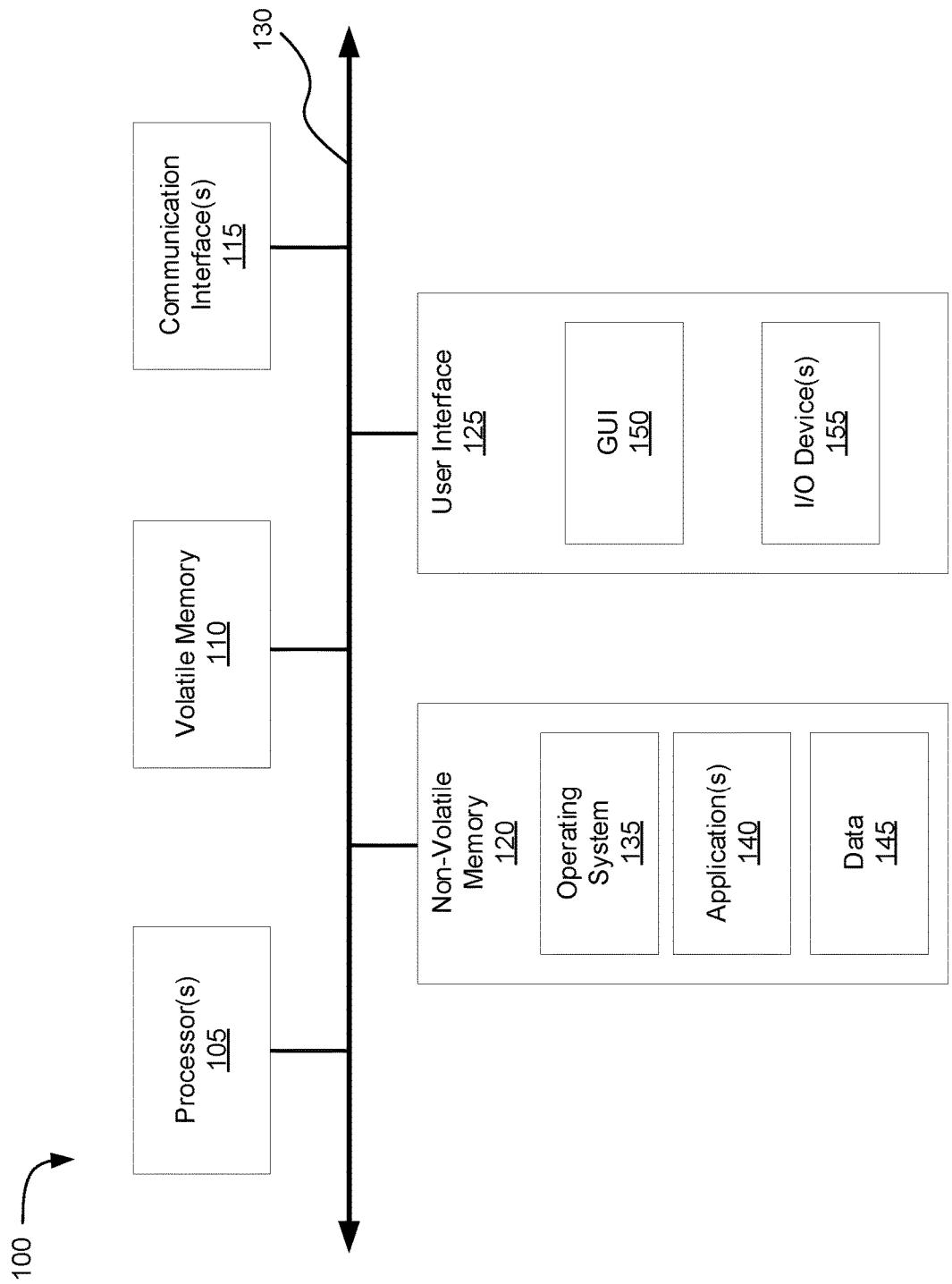
FIG. 1A is a block diagram of embodiments of a computing device.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
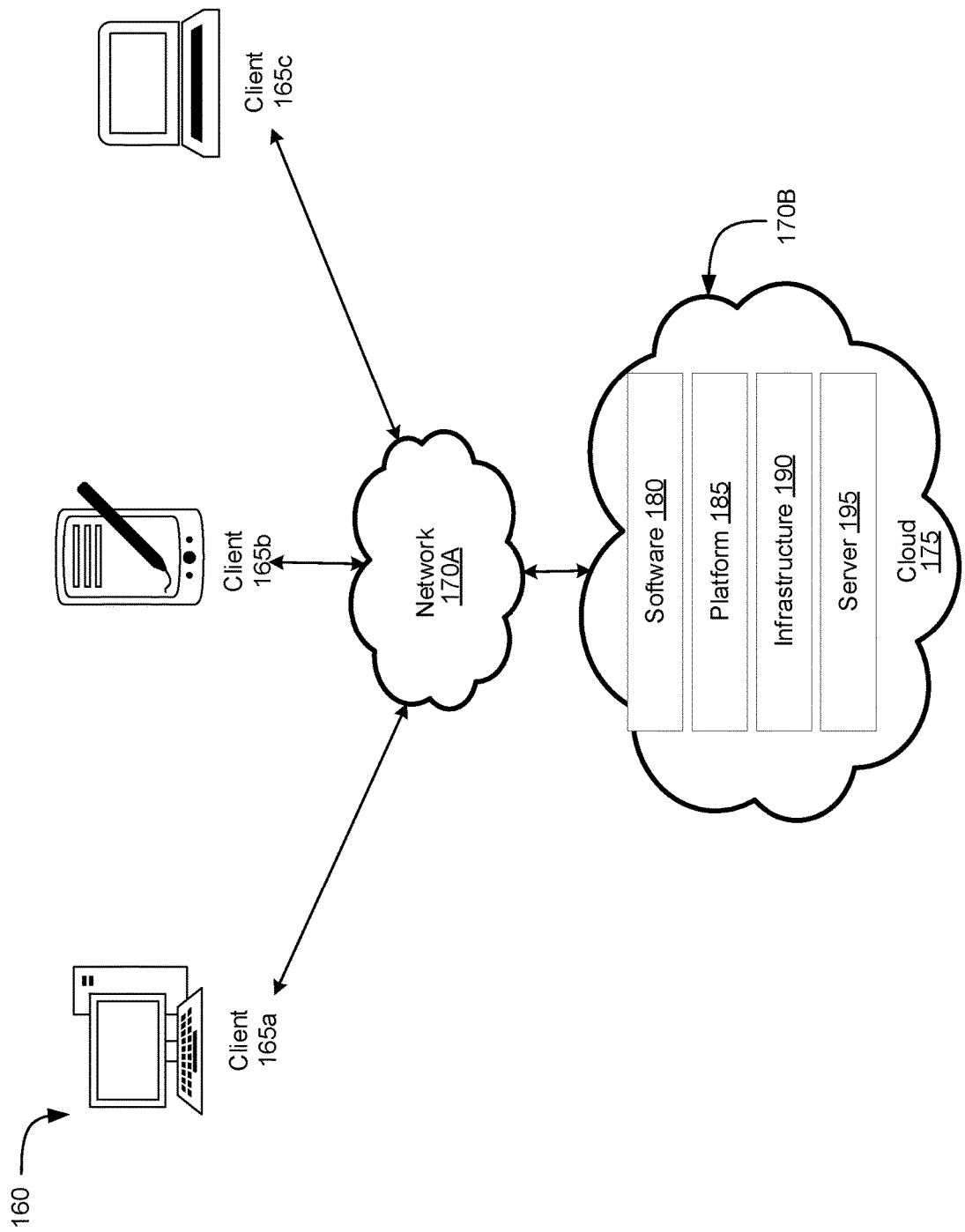
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Selecting a Version of an Application

Systems and method for selecting a version of an application according to a context of a user, one or more attributes of a client device and one or more attributes of an application are provided herein. In embodiments, a device can aggregate a plurality of versions of an application available to a user to generate a common icon (e.g., aggregated icon) that is associated with or linked with the respective application and consolidate or reduce the number of overall icons provided to the user. For example, the device can identify different versions of an application available or accessible to a user of a client device, including but not limited to, local versions, hosted versions and/or SaaS versions. The device can compare the attributes of the different versions to determine that each of the versions corresponds to the same or similar application. The device can link the different versions to a common icon, for example, by applying a tag (e.g., aggregation tag) or identifier to each of the different versions. The common icon can be provided to the user through the client device and responsive to a selection of the common icon, the device can determine and select a correct or appropriate version of the selected application based in part on a context of the user, a context of the client device and the one or more attributes of the selected application. For example, in some embodiments, the device can select at least one of a local version, hosted version or SaaS version based in part on a location of the user (e.g., location of the client device), a time of day, network properties and/or one or more access rules for accessing the selected application. The device can provide or launch the selected version of the application to the user through the client device.

Figure 2:
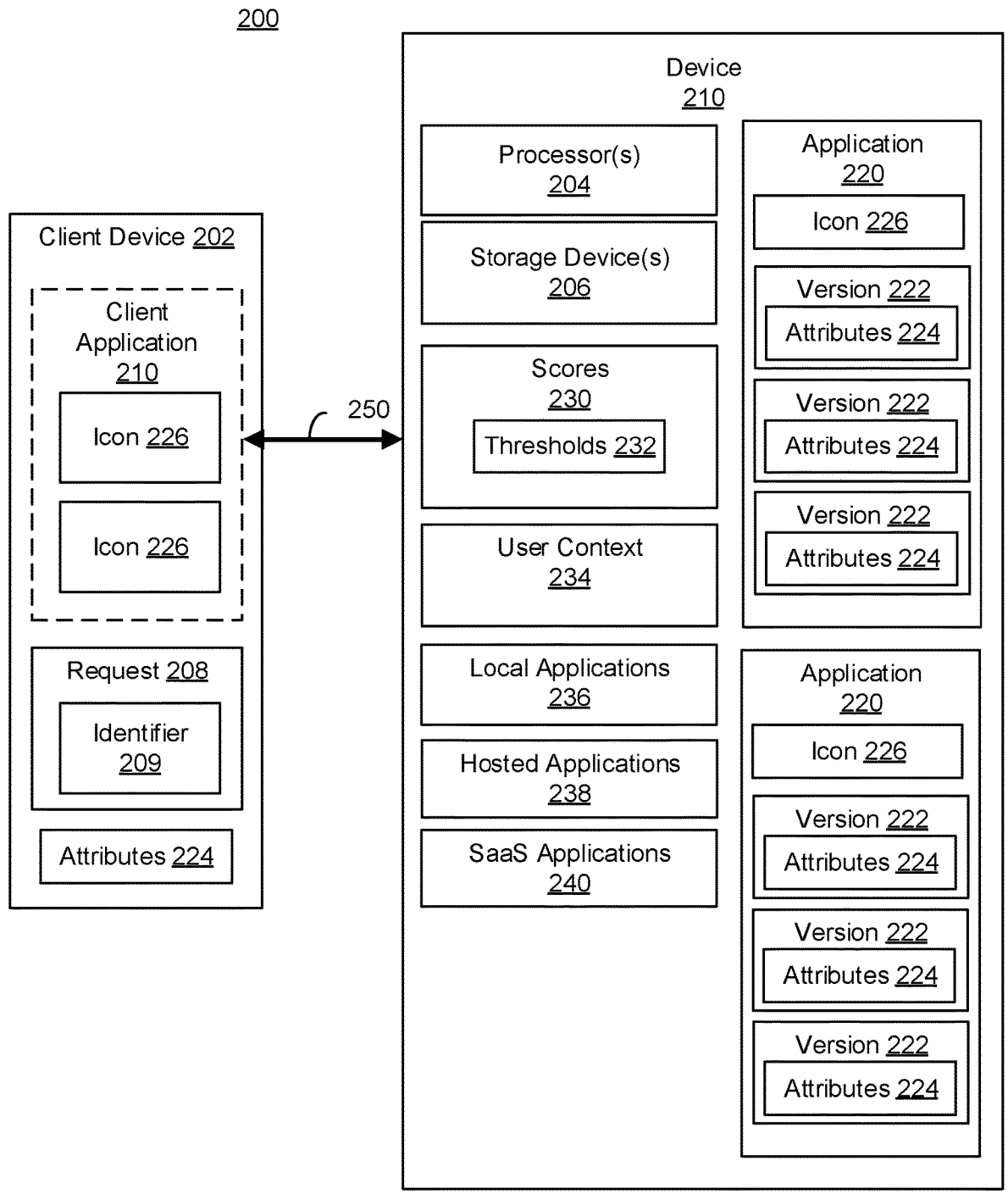
FIG. 2 is a block diagram of a system for selecting a version of an application.

Referring to FIG. 2, depicted is a block diagram of one embodiment of an environment 200 having a device 210 (e.g., workspace server) providing access to a plurality of versions 222 of a plurality of applications 220 for a client device 202. In embodiments, the environment 200 can be the same as or substantially similar to the system 400 of FIGS. 4A-4B or the cloud computing environment 414 of FIGS. 4B-4C. In some embodiments, an application 220 can include multiple versions 222 (e.g., local version, hosted version, SaaS version) that a client device 202 can access, for example, using the device 210. The device 210 can include or correspond to a client application 210 that is provided to and/or executing on a client device 202 to provide access to or host one or more applications 220 by the client device 202. The device 210 can broker and provide access to different versions 222 of an application 220 for the client device 202, for example, according to a context 234 of a user (e.g., user 426 of FIG. 4B) and/or an attribute of the client device 202. In some embodiments, the device 210 can be a workspace platform server or traffic management server configured to control access to the different versions 222 of multiple applications 220 for one or more client devices 202.

The device 210 can be implemented using hardware or a combination of software and hardware. For example, components of the device 210 can include logical circuitry (e.g., a central processing unit or CPU) that responses to and processes instructions fetched from a memory unit (e.g., storage device 206). Components of the device 210 can include or use a microprocessor or a multi-core processor. A multi-core processor can include two or more processing units (e.g., processor 204) on a single computing component. Components of the device 210 can be based on any of these processors, or any other processor capable of operating as described herein. Processors can utilize instruction level parallelism, thread level parallelism, different levels of cache, etc. For example, the device 210 can include at least one logic device such as a computing device or server having at least one processor 204 to communicate with one or more client devices 202. The components and elements of the device 210 can be separate components or a single component. The device 210 can include a memory component (e.g., storage device 206) to store and retrieve data (e.g., user context 234, attributes 224, scores 230, thresholds 232). The memory can include a random access memory (RAM) or other dynamic storage device, coupled with the storage device 206 for storing information, and instructions to be executed by the device 210. The memory can include at least one read only memory (ROM) or other static storage device coupled with the storage device 206 for storing static information and instructions for the device 210. The memory can include a storage device 206, such as a solid state device, magnetic disk or optical disk, to persistently store information and instructions. The device 210 can be the same as or substantially similar to computer 100 of FIG. 1A and/or resource management service 402 of FIGS. 4A-4C. In embodiments, the device 210 can be the same or substantially similar to cloud computing environment 414 of FIGS. 4B-4C.

The device 210 can include a processor 204. The processor 204 can include non-volatile memory that stores computer instructions and an operating system. For example, the computer instructions can be executed by the processor 204 out of volatile memory to perform all or part of the method 300. In some embodiments, the device 210 can include a non-transitory computer-readable medium, comprising instructions that, when executed by the processor 204 of the device 210, cause the processor 204 to perform all or part of the method 300. The processor 204 can include a database and be configured to generate and/or store scores 230 and attributes 224 for one or more versions 222 of one or more applications 220.

In some embodiments, the processor 204 can receive and analyze a request 208 from a client device 202 to identify an identifier 209 included with the request 208. For example, the processor 204 can use the identifier 209 to determine a plurality of versions 222 of a requested application 220. In embodiments, the processor 204 can select a version 222 of a requested application 220 according to a context 234 of a user and/or an attribute of a client device 202. The processor 204 can include non-volatile memory that stores computer instructions and an operating system. For example, the computer instructions can be executed by the processor 204 out of volatile memory to perform all or part of the method 300. The device 210 can include a non-transitory computer-readable medium that includes instructions that, when executed by the processor 204 of the device 210 cause the processor 204 to execute or perform the functionalities of the method 300.

The device 210 can generate scores 230 for a user or client device that can be used to determine access to different versions 222 of an application 220. The scores 230 can include risk scores and/or relevance scores. The device 210 can generate and determine scores 230 (e.g., risk scores) for a risk of a particular user or client device 202 accessing a version 222 of an application 220. For example, the device 210 can determine a risk or score 230 to determine if a particular user or particular client device 202 can access a version 222 of an application 220 and/or is provided a particular level of access to the version 222 of the application 220. In embodiments, a first score 230 can indicate that a user of a client device 202 can access or be provided access to a particular version 222 of an application 220 and a second score 230 can indicate that a user of a client device 202 is denied access to a particular version 222 of an application 220. In some embodiments, a first score 230 can indicate that a user of a client device 202 can have a first level (e.g., full access) of access or be provided a first level of access to a particular version 222 of an application 220 and a second score 230 can indicate that a user of a client device 202 can have a second level (e.g., partial access, limited access) access or be provided a second level of access to a particular version 222 of an application 220. The device 210 can compare the score 230 to a threshold 232 (e.g., risk threshold) to determine whether to provide access to a version 222 of an application 220 to a user of a client device 202 and/or to determine a level of the access to a version 222 of an application 220 for the user of the client device 202. For example, a score 230 greater than the threshold 232 can indicate that a user and/or a client device 202 can access a version 222 of an application 220 and a score 230 less than the threshold 232 can indicate that a user and/or client device 202 is denied access to a version 222 of an application 220.

The device 210 can generate and determine scores 230 (e.g., relevance scores) that correspond to or indicate a relation, similarity or relevance between different versions 222. For example, a score 230 can indicate that at least two versions 222 are the same, same type of application 220 (e.g., multiple versions of a word editing application, multiple versions of an image editing application) or versions that perform similar tasks or functions. The device 210 can generate the scores 230 using attributes 224 of the versions 222. The device 210 can identify attributes 224 (e.g., application type, function) and compare the attributes 224 to generate a score 230 for multiple versions 222. In some embodiments, the score 230 can indicate the number of attributes 224 multiple versions 222 have in common or a percentage of attributes 224 multiple versions 222 have in common. In some embodiments, the device 210 can compare the scores 230 for multiple versions 222 to a threshold (e.g., relevance threshold) to determine if the respective versions 222 are the same or similar applications 220. For example, a score 230 greater than the threshold 232 can indicate that the versions 222 are the same or similar applications 220. In embodiments, a score 230 less than the threshold 232 can indicate that versions 222 are not the same or similar applications 220. The thresholds 232 can include a number, a range of numbers, a percentage, a range of percentages, a value, and/or a range of values.

The device 210 can execute one or more processes or methods (e.g., machine learning algorithm, neural network) to determines scores 230 for the versions 222 of an application 220. For example, the device 210 can compare two or more of a context 234 of a user, attributes 224 of a client device 202 and/or attributes of a version 222 of an application 220 of a version 222 of an application 220 and generate a score 230 (e.g., risk score) for a version 222 of an application 220 in view of the user and/or client device 202 requesting access to the application 220.

The device 210 can determine a context 234 of a user (e.g., user 426 of FIG. 4B). The context 234 can include one or more of the following: identification of a user, a user profile, a location of the user, a time of day, a location of a client device 202, information about the one or more applications 220, information about security of the user or the client device, an authorization or security level of the user and/or client device 202, a group of the user, connection 250 properties (e.g., secure, encrypted) and/or network properties (e.g., public, private). The device 210 can maintain and store the context 234 for a plurality of users in the storage device 206. The device 210 can determine the context 234 from a login event between the client device 202 and the device 210. For example, the login event can include the client device 202 transmitting or providing an identification of a user, a user profile, a location of the user, a time of day, and/or a location of a client device 202. The device 210 can determine the context 234 from a request 208 received from a client device 202 identifying the user. In embodiments, the device 210 can determine the context 234 using one or more attributes 224 (e.g., location, type of client device, network properties, connection properties). For example, the request 208 can include or indicate the user of the client device 202, identify the client device 202, a type of client device 202 (e.g., personal device, work device, mobile device), a time value (e.g., time of day, time when application is requested), and a location of the client device 202.

The attributes 224 of the versions 222 of an application 220 can include, but are not limited to, a type of application, a security or authorization level for a version 222 of an application 220, a task performed by the application 220, a function performed by the application 220, and/or an originator of the application 220. The attributes 224 can be compared to a context 234 of a user and/or client device 202 to determine if the respective user and/or client device 202 can access a particular version 222 of the application 220. The authorization level or security level can indicate one or more properties of a context 234 of a user and/or client device 202 that the respective user and/or client device 202 should meet to access a particular version 222 of an application 220. For example, in one embodiment, the authorization level or security level can indicate that the client device 202 should be within a particular geo-location to access a version 222 of an application 220 and/or that only users of a particular group (e.g., a group or administrative level to which the user belongs) can access a version 222 of an application 220.

The versions 222 can include, but are not limited to, a local application, a hosted application and/or a SaaS application. The device 210 can include or connect with one or more services to record and maintain records for different versions 222 of applications 220. For example, the device 210 can include or connect with a local application service 236 to maintain and update records for local versions 222 of applications 220 (e.g., native applications) for one or more users and/or one or more client devices 202. The device 210 can include or connect with a hosted application service 238 to maintain and update records for hosted versions 222 of applications 220 (e.g., virtual applications, virtual desktops) for one or more users and/or one or more client devices 202. The device 210 can include or connect with a SaaS application service 240 to and maintain and update records for SaaS versions 222 of applications 220 (e.g., SaaS applications) for one or more users and/or one or more client devices 202.

The device 210 can generate one or more identifiers 209 to apply to tag versions 222 of an application 220. The identifier 209 can include a tag, code, or script indicating multiple versions 222 of an application 220. The device 210 can generate and apply the identifier 209 to versions 222 of a common application 220. In embodiments, the device 210 can apply the identifier 209 to individual versions 222 of an application 220 such that different versions 222 of the same application 220 receive the same identifier 209.

The device 210 can generate an icon 226 (e.g., aggregation icon, common icon) for multiple versions 222 of the same, common or similar application 220. The icon 226 can include a graphical user interface, a link, a symbol or selectable object provided or displayed within a portion of a display area of a client device 202. The icon 226 can be linked with, represent or associated with multiple versions 222 of the same, common or similar application 220. For example, the device 210 can receive a request 208 for a particular application 220 responsive to a user interaction (e.g., selection, click-on) with at least one icon 226 associated with the multiple versions 222 of the application 220.

The applications 220 can include resources, desktops, and or files. In embodiments, the applications 220 can include native applications (e.g., native or local to a client device 202, local to a client device 202), hosted applications (e.g., virtual applications, virtual desktops), Software as a Service (SaaS) applications, virtual desktops, virtual applications, web applications, mobile applications, and other forms of content. In some embodiments, the applications 220 can include or correspond to applications provided by remote servers or third party servers. In embodiments, the applications 220 can include or correspond to the SaaS applications 410 of FIGS. 4A-4B.

The client device 202 can include, but not limited to a computing device or a mobile device. The client device 202 can include or correspond to an instance of any client device, mobile device or computer device described herein. For example, the client device 202 can be the same as or substantially similar to computer 100 of FIG. 1A and client 202 of FIGS. 4A-4C. The client device 202 can couple with the device 210 through one or more connections 250. In embodiments, the client device 202 can execute or run a client application, for example, provided by device 210 to provide access to an application 220 or to enable access to an application 220. For example, the client application can execute or run within a browser (e.g., embedded browser) of the client device 202. The client device 202 can couple with or connect with the device 210 through a connection 250 to access at least one application hosted or provided by the device 210. The connections 250 can correspond to or be used to establish an application session, an execution session, a desktop session, a hosted desktop session, a terminal services session, a browser session, a remote desktop session, a URL session and/or a remote application session. The connections 250 may include encrypted and/or secure sessions established between the device 210 and a client device 202. For example, a connection 250 may include an encrypted session and/or a secure session established between the device 210 and a client device 202. The encrypted connection 250 can include an encrypted file, encrypted data or traffic transmitted between the device 210 and a client device 202.

The above-mentioned elements or entities may be implemented in hardware, or a combination of hardware and software, in one or more embodiments. Components of the device 210 may be implemented using hardware or a combination of hardware or software detailed above in connection with FIGS. 1A-1B and FIGS. 4A-4C. For instance, these elements or entities can include any application, program, library, script, task, service, process or any type and form of executable instructions executing on hardware of a device (e.g., device 210). The hardware includes circuitry such as one or more processors in one or more embodiments.

Figure 3:
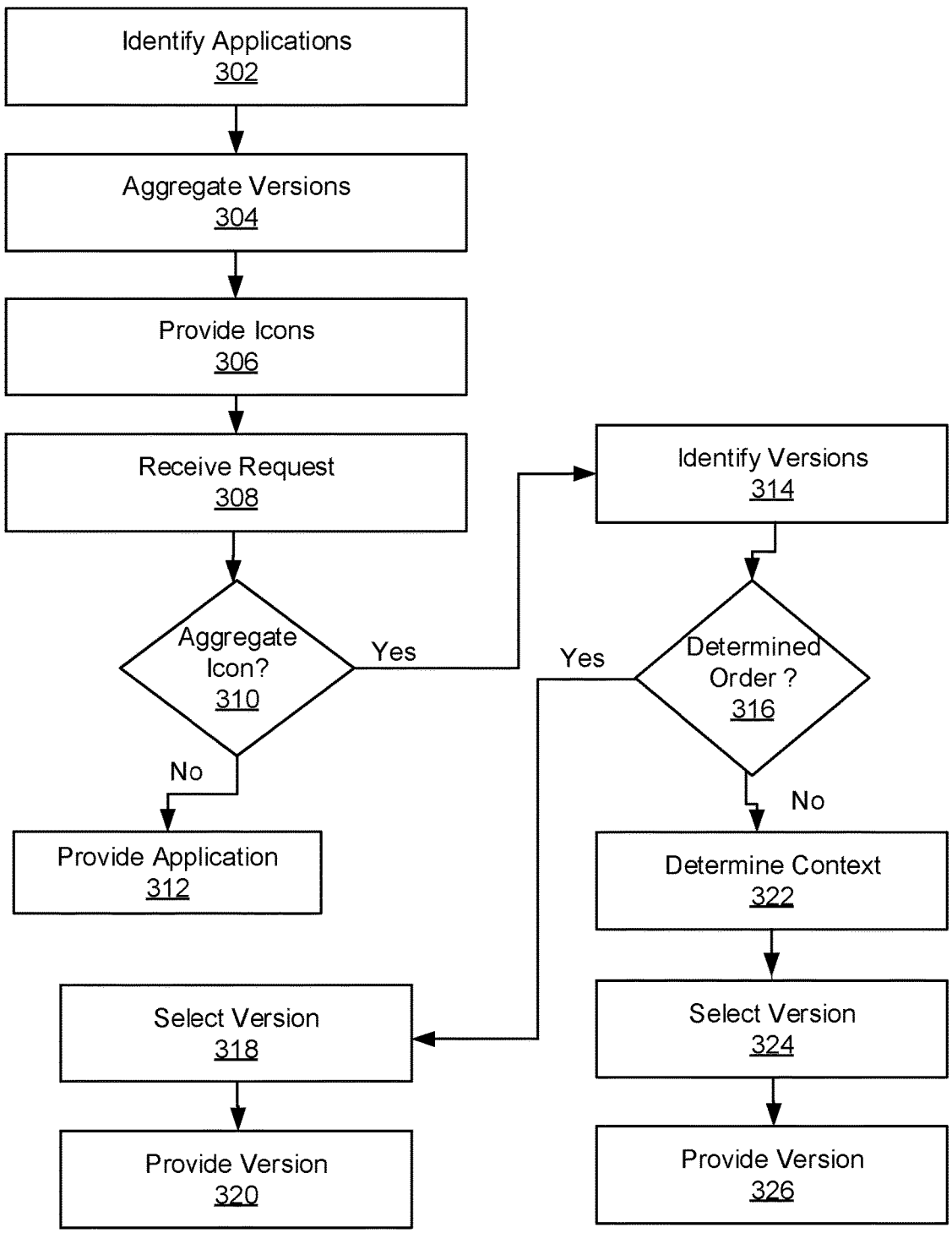
FIG. 3 is a flow diagram of a method for selecting a version of an application.

Referring now to FIG. 3, depicted is a flow diagram of one embodiment of a method 300 for selecting a version of an application. In brief overview, the method 300 can include one or more of: identifying applications (302), aggregating versions (304), providing icons (306), receiving a request (308), determining if the request is associated with an aggregated icon (310), if not, providing an application (312), if so, identifying versions (314), determining if a determined order applies (316), if so, select the version (318), providing the version (320), if not, determine a context (322), selecting a version (324), and providing the version (326). The functionalities of the method 300 may be implemented using, or performed by, the components detailed herein in connection with FIGS. 1A-2 and 4A-4C.

Referring now to operation (302), and in some embodiments, one or more applications can be identified. A device 210 can identify one or more applications 220 that a user of a client device 202 and/or the client device 202 has authorization to access, has access to or are otherwise accessible through the client device 202. The device 210 can identify or combine the versions 222 of applications 220 identified for the user of the client device 202 and/or the client device 202. For example, the device 210 can compare the local versions 222, hosted versions 222, and/or SaaS versions 222 of a plurality of applications 220 applications 220 use the determined, for example, the profile (e.g., The multiple or plurality of versions 222 of an application 220 can include, but are not limited to, one of: a hosted application, a Software as a Service (SaaS) application or a local application of the client device. For example, the same application 220 can include different versions 222 (e.g., local version, hosted versions, SaaS version) that the user of the client device 202 and/or the client device 202 has access to or can launch through the client device 202. In one embodiment, the client device 202 can access a local version 222 of a document editing application 220, a hosted version 222 (e.g., work related version) of the document editing application 22 and a SaaS version 222 of the document editing application 220. The device 210 can identify applications 220 having multiple different versions 222 that are available to the user of the client device 202 and/or the client device 202. The device 210 can generate and maintain a record of applications 220 and versions 222 that a client device 202 can access or request access to through the device 210 and store the records, for example, in the storage device 206.

In embodiments, the device 210 can determine or identify local applications 220 (e.g., native applications) installed or executing locally on a client device 202 (e.g., active client device, current client device) or plurality of client devices 202 associated with the user. For example, the device 210 can transmit a request to a client device 202 to identify local applications 220 locally installed on the client device 202, for example, to register the local applications 220 with the device 210. The device 210 can transmit the request and receive a response identifying one or more local applications 220 locally installed on the client device 202 and/or associated with at least one user of the client device 202. In some embodiments, the device 210 can provide a prompt or window for a user of the client device 202 to enter one or more local applications 220 locally installed on the client device 202.

The device 210 can identify hosted applications accessible to the client device 202. The device 210 can identify SaaS applications accessible to the client device 202 from a remote computing device (e.g., a third party server or third party provider)(e.g., workspace applications, company applications, private network applications). For example, the device 210 can retrieve a profile for the client device 202 (e.g., device profile) or user (e.g., user profile) of the client device 202. The user profile can include one or more hosted applications 220 and/or SaaS applications that the client device 202 previously accessed, established a connection to or at least one session with. In some embodiments, the device 210 can identify the icons 226 provided by the client device 202 and the applications 220 associated with the respective icons 226. In some embodiments, the device 210 can transmit a request to the client device 202 requesting a listing of icons 226 provided by the client device 202 and the applications 220 associated with the respective icons 226.

The client device 202 can transmit a response that includes the listing of icons 226 provided by the client device 202 and the applications 220 associated with the respective icons 226. Referring now to operation (304), and in some embodiments, versions of the applications can be aggregated. Aggregation as described herein can include, but is not limited to, the linking, combining, grouping or associating of multiple versions 222 (e.g., two or more) of the same application 220 with each other using a common identifier 209. For example, in some embodiments, the multiple versions 222 of the same application 220 can be tagged using the same identifier 209 to associate each of the multiple versions 222 with each other.

The device 210 can determine one or more attributes 224 of the different versions 222 of the applications 220. For example, the attributes 224 can include, but are not limited to, a type of application 220, a function of the application 220, or a task performed by the application 220. The device 210 can compare the attributes 224 of two or more versions 222 to determine if the versions 222 are for the same application 220 or same type of application 220. For example, in some embodiments, if the versions 222 have a determined number of attributes 224 (e.g., 1 attribute, 2 attributes, more than 2 attributes) in common, the device 210 can determine the versions 222 correspond to the same application 220 or similar application 220. The number of attributes 224 used to determine a relationship or relevance between different versions 222 can vary and be selected based in part on the application 220 and/or a number of versions 222 associated with an application 220.

In some embodiments, the device 210 can generate scores 230 (e.g., relevance score) and use a threshold 232 (e.g., relevance threshold) to determine a relation, similarity or relevance between different versions 222. The device 210 can generate a score 230 for individual versions 222 based on a comparison of attributes 224 of the versions 222 of the application 220. For example, the device 210 can compare the attributes 224 to generate a score 230 for multiple versions 222. The score 230 can indicate the number of attributes 224 the multiple versions 222 have in common or a percentage of attributes 224 the multiple versions 222 have in common with each other. The device 210 can compare the scores 230 for multiple versions 222 to a threshold 232 (e.g., relevance threshold) to determine if the respective versions 222 correspond the same application 220 or similar application 220. For example, a score 230 greater than the threshold 232 can indicate that the versions 222 correspond to the same application 220 or similar application 220. In embodiments, a score 230 less than the threshold 232 can indicate that the versions 222 do not correspond to the same application 220 or similar application 220. In some embodiments, the attributes 224 can be weighted or assigned weight values such that certain attributes 224 are weighted more heavily (e.g., greater importance) that other attributes in determining a relationship between different versions 222. For example, in one embodiment, an application type attribute 224 can be assigned a first weight and a function attribute 224 can be assigned a second weight. The first weight can be greater than the second weight such that versions 222 that are the same application type can be scored higher or identified as having a closer relationship as compared to versions 222 performing a similar function. The device 210 can determine a score 230 for the versions 222 using the weighted attributes 224. The weights assigned to the attributes 224 can vary and be selected based at least in part on the particular application 220.

The versions 222 identified as the same application 220 or similar application 220 can be aggregated, linked or associated with each other. For example, the device 210 can apply, assign or label the versions 222 with an identifier 209 that identifies some or all of the versions 222 in common with the application 220. The identifier 209 can include a tag, code, or script applied to individual versions 222 of the application 220 when the respective version 222 is requested or accessed. In some embodiments, the identifier 209 can include or correspond to an aggregation tag to link multiple versions 222 of the same application 220 with each other. For example, the versions 222 of the same application 220 can be tagged with the same identifier 209 to link or aggregate the respective versions 222. The device 210 can apply the identifier 209 to the multiple versions 222 of the application 220 having a score 230 greater than a threshold level 232. The device 210 can aggregate the multiple versions 222 having the identifier 209 with an icon 226 to provide a single icon 226 that represents the application 220 on the client device 202 instead of providing multiple icons each of which being representative of a different version of the application 220.

Referring now to operation (306), and in some embodiments, an icon can be provided. The device 210 (e.g., via client interface service 416) can generate an icon 226 for aggregated versions 222 of an application 220. For example, the device 210 can aggregate multiple versions 222 having the identifier 209 with an icon 226 to provide the icon 226 to the client device 202 for requesting the application 220. The icon 226 can be an aggregation icon or common icon linked with or associated with at least one application 220 and multiple versions 222 of the application 220. The device 210 can generate the icon 226 as a graphical user interface, a link, a symbol or selectable object to be provided or displayed within a portion of a display area of a client device 202. The device 210 can apply, assign or label the icon 226 with the identifier 209 such that the device 210 can receive a request 208 including the identifier 209 or a particular application 220 responsive to a user interaction (e.g., selection, click-on) with the icon 226 associated with the multiple versions 222 of the application 220.

The device 210 can provide the icon 226 to the client device 202. In embodiments, the device 210 can provide a plurality of icons 226 (e.g., plurality of aggregated icons indicative of applications 220 available to the client device 202 and having multiple versions 222) to the client device 202. For example, the device 210 can provide the icon 226 (or plurality of icons 226) to an active client device 202 (e.g., a client device connected to device 210) or a client device 202 currently in use and connected to the device 210. In some embodiments, the device can provide the icon 226 to a client application executing on the client device 202 of the user and display the icon 226 within a display area of the client device 202 through the client application.

Referring now to operation (308), and in some embodiments, a request can be received. The device 210 can receive a request 208 from a client device 202 to launch an application 220. The request 208 can include an identifier 209 that indicates or identifies multiple versions 222 of the application 220 that are accessible in which to launch the application 220. In some embodiments, the request 208 can include an identifier for the client device 202 the request is received from and/or an identifier for a user of the client device 202.

In embodiments, a user of the client device 202 can select or interact with an icon 226 representative of an application 220. The user interaction (e.g., click on, select) through the client device 202 can cause the client device 202 to transmit a request to the device 210 for the application 220 represented by the selected icon 226. In some embodiments, the icon 226 can be provided to the client device 202 through a client application and the user interaction with the icon 226 can cause the client application to transmit a request to the device 210 for the application 220 represented by the selected icon 226. The icon 226 can be linked with the identifier 209 such that in response to the user interaction with the icon 226, the device 210 receives the request 208 and the identifier 209.

Referring now to operation (310), and in some embodiments, a determination can be made if the request corresponds to an aggregated icon. The device 210 can determine if the request 208 is for an application 220 having multiple versions 222. For example, the device 210 can use the identifier 209 included with the request 208 to identify the requested application 220. The device can determine if the application 220 has multiple versions 222 or a single version 222 available. In some embodiments, the device 210 can compare an authorization level or security level of the user of the client device 202 and/or the client device 202 to determine a number of versions 222 of an application 220 available to the user of the client device 202 and/or the client device 202. For example, the authorization level can indicate which versions 222 (e.g., only local version, only hosted version and SaaS version) of an application 220 that a client device 202 or user of the client device 202 can access. The device 210 can determine the number of versions 222 of an application 220 available to the user of the client device 202 and/or the client device 202 using the versions 222 indicated by the authorization level. In embodiments, if the request 208 is for an application 220 having only one version 222, the method 300 can move to (312). In embodiments, if the request 208 is for an application 220 having only one version 222, the method 300 can move to (314).

Referring now to operation (312), and in some embodiments, an application can be provided. The device 210 can determine the requested application 220 has a single version 222 or the user of the client device 202 and/or the client device 202 is authorized (e.g., allowed) to access to a single version 222 of the requested application 220. The device 210 can provide the client device 202 with access to the available or determined version 222 of the application 220, so as to enable the client device 202 to launch the version 222 of the application 220. In embodiments, the device 210 can provide the version 222 of the requested application 220 to the client device 202 and the client device 202 can launch or activate the version 222 of the application 220. In some embodiments, the device 210 can provide access to the version 222 of the application 220 through a client application executing on the client device 202 and launch or activate the version 222 of the application 220 through the client application. The device 210 can provide the client device 202 with a uniform resource locator (URL) of the selected version 222 of the application 220, so as to enable the client device 202 to launch the version 222 of the application 220 compatible with the context 234. In some embodiments, a user can select or otherwise interact with the provided URL through the client device 202 causing the client device 202 to launch or activate the version 222 of the application 220 compatible with the context 234. The URL can include, but is not limited to, a URL for a hosted version 222 of an application, a URL for a SaaS version 222 of an application 220, or a URL for a local version 222 (e.g., locally installed on client device 202) of an application 220.

Referring now to operation (314), and in some embodiments, a plurality of versions can be identified. The device 210 can determine the requested application 220 has multiple versions 222 or the user of the client device 202 and/or the client device 202 is authorized (e.g., allowed) access to multiple versions 222 of the requested application 220. The device 210 can use the identifier 209 included with the request 208 to identify the multiple versions 222 associated with the requested application 220. For example, the multiple versions 222 of the application can be linked with, tagged with or associated with the identifier 209. The device 210 can perform a search, for example, using the identifier 209 (e.g., tag) to identify the different versions 222 of the application 220 for the user of the client device 202 and/or the client device 202.

Referring now to operation (316), and in some embodiments, a determination can be made if an order (e.g., predetermined order) should be applied. The device 210 can identify if a determined order, order rule, network rule or administrator rule is implemented or established that indicates the order in which different versions 222 of an application 220 are to be provided to a client device 202. In embodiment, the device 210 (or administrator) can generate a determined order and apply the determined order to requests for applications 220. For example, the determined order can indicate that a first version 222 of an application 220 that is to be provided first if the first version 222 exists or is available. The determined order can indicate that a second version 222 of an application 220 is to be provided second if the second version 222 exists or is available and the first version is not available. The determined order can indicate that a third version 222 or subsequent version 222 of an application 220 is to be provided third if the third version 222 exists or is available and the first and second versions 222 or previous versions 222 are not available. In embodiments, if a determined order is identified, the method 300 can move to (318). In embodiments, if no determined order applies, exists or is identified, the method 300 can move to (322).

Referring now to operation (318), and in some embodiments, a version can be selected. The device 210 can select, according to an order of access for the versions 222 of the application 220. For example, the device 210 can use the order to select the version 222 of the application 220 to provide access to the client device 202. The device 210 can determine if the first version 222 indicated by the order is available and select the first version 222. The device 210 can determine availability based in part on if the version 222 exists (e.g., does a local version exist, does a hosted version exist) and/or an authorization level (e.g., authorized to use indicated version) of the user of the client device 202 and/or the client device 202. If the first version 222 indicated is not available, the device 210 can continue to the next or subsequent version indicated by the order until the device 210 identifies a version 222 available to the user of the client device 202 and/or the client device 202. In one embodiment, the device 210 can provide access to a local or native version 222 of the application 220 first, a SaaS version 222 of the application 220 second, and a hosted version 222 of the application 220 third. The order can vary and be determined based in part on the versions 222 of the application 220 available, a context if the user of the client device 202 and/or attributes of the client device 202.

Referring now to operation (320), and in some embodiments, the version can be provided. The device 210 can provide the client device 202 with access to the selected version 222 of the application 220. In embodiments, the device 210 can enable the client device 202 to launch the version 222 of the application 220. The device 210 can provide the version 222 of the requested application 220 to the client device 202 and the client device 202 can launch or activate the version 222 of the application 220. In some embodiments, the device 210 can provide access to the version 222 of the application 220 through a client application executing on the client device 202 and launch or activate the version 222 of the application 220 through the client application. For example, the device 210 can provide the device 210 with a URL of the selected version 222 of the application 220, so as to enable the client device 202 to launch the version 222 of the application 220 compatible with the context 234. In some embodiments, a user can select or otherwise interact with the provided URL through the client device 202 causing the client device 202 to launch or activate the version 222 of the application 220 compatible with the context 234. The URL can include, but is not limited to, a URL for a hosted version 222 of an application, a URL for a SaaS version 222 of an application 220, or a URL for a local version 222 (e.g., locally installed on client device 202) of an application 220.

Referring now to operation (322), and in some embodiments, a context can be determined. The context 234 can include, but is not limited to, an identification of a user, a user profile, a location of the user, a time of day, a location of a client device 202, information about the one or more applications 220, information about security of the user or the client device, an authorization or security level of the user and/or client device 202, a group of the user, connection 250 properties (e.g., secure, encrypted) and/or network properties (e.g., public, private). The device 210 can use the context 234 determine which versions 222 of an application 220 can be provided to the client device 202.

In embodiments, the device 210 can determine that no order applies or exists for the requested application 220. In such instances, the device 210 can determine a context 234 of the user of the client device 202 and/or one or more attributes 224 of the client device 202. The device 210 can determine the context 234 from the request 208. For example, the request 208 can indicate the user of the client device 202, identify the client device 202, a type of client device 202 (e.g., personal device, work device, mobile device), a time value (e.g., time of day, time when application is requested), and a location of the client device 202. In embodiments, the device 210 can determine the context 234 from a user profile or user record maintained at the device (e.g., storage device 206) and retrieve the user context 234 responsive to receiving the request 208. For example, the user profile can include information about security of the user or the client device 202, an authorization or security level of the user and/or client device 202, and/or a group of the user (e.g., work group, employment type). In some embodiments, the device 210 can determine or retrieve the context 234 for a user of the client device 202 and/or the client device 202 from one or more services (e.g., services described with respect to FIGS. 4A-4C) of the device 210 and/or connected to the device 210. In embodiments, the services can include or correspond to the resource management service 402 of FIGS. 4A-4B, the resource feed 406 of FIGS. 4A-4B, the gateway service 408 of FIGS. 4A-4B, the identity provider 412 of FIGS. 4A-4B, the client interface service 416 of FIG. 4B, the identify service 418 of FIG. 4B, the resource feed service 420 of FIG. 4B, the single sign-on service 422 of FIG. 4B, the systems of record 428 of FIG. 4C, the microapp service 430 of FIG. 4C, the data integration provider service 432 of FIG. 4C, the credential wallet service 434 of FIG. 4C, and the active data cache service 436 of FIG. 4C.

The device 210 can determine the context from at least one connection 250 between the device 210 and the client device 202. For example, during establishment of the connection 250 between the device 210 and the client device 202, the device 210 can receive credentials for the user of the client device 202, credentials for the client device 202, a type of connection 250 (e.g., private, encrypted), and/or network properties (e.g., private, public, work environment). In embodiments, the credentials can include a password, token or certificate provided by the client device 202 to the device 210 to establish the connection 250 between the device 210 and the client device 202 and indicate an authorization or security level of the user and/or client device 202.

In some embodiments, scores can be generated. The device 210 can generate scores 230 (e.g., risk scores) indicating a risk level or security level for a user of the client device 202 and/or the client device 202. The device 210 can use the score 230 to determine whether to provide a user of the client device 202 and/or the client device access to a version 222 of an application 220 and/or what level of access to provide the version 222 of the application 220 from the client device 202. In embodiments, the device 210 can perform a contextual analysis to generate the scores 230 for the user of the client device 202 and/or the client device to determine access to different versions 222 of the application 220. For example, the device 210 can compare the context 234 (e.g., including scores 230) of the user of the client device 202 and/or one or more attributes of the client device 202 to one or more attributes 224 of the application and/or one or more attributes 224 of the versions 222 of the application 220. In some embodiments, the device 210 can compare the context 234 of the user to one or more attributes 224 of the application and the context 234 of the user can include one of: a user location, a type of client device 202, a score 230 for a user of the client device 202, or a time of day.

The device 210 can provide as inputs (e.g., inputs useful with a machine learning model, a neural network, etc.) such as anyone of the following: the context 234 of the user of the client device 202 (e.g., user identification), one or more attributes of the client device 202 (e.g., location of client device, type of client device, one or more attributes 224 of the application (e.g., authorization levels, type of application), one or more attributes 224 of the versions 222 (e.g., authorization levels) of the application 220 and/or contextual data obtained by the device 210. The device 210 can generate, responsive to the receipt and comparison of the inputs, a score for individual versions 222 of the application 220. In embodiments, the device 210 can generate a score 230 for a user of the client device 202 and/or the client device 202 to determine access to individual, identified versions 222 of a requested application 220. The score 230 can indicate a risk or security issue with the particular user of the client device 202 and/or the particular client device 202 accessing the respective version 222 of the application 220 from the client device 202.

For example, in one embodiment, the device 210 can determine if a score 230 (e.g., risk score) of the user of the client device 202 is greater than a risk threshold (or within a risk limit range) and the device 210 can determine whether the client device 202 is a compliant device (e.g., has approved authorization), whether the client device 202 is attempting to access the application from an approved location (e.g., within an approved geo-location), and if the request 208 was transmitted during an approved time of day (e.g., during approved work hours) and generate a score 230 in response to the comparison. In some embodiments, the device 210 can determine the client device is non-compliant if the client device 202 has outdated operating system, improperly modified operating system (e.g., jailbroken device) or the presence of known malware is detected. In embodiments, the device 210 can deny a user of the client device 202 and/or the client device 202 access to a first version 222 of a first application 220 using the context 234 of the user, context 234 of the client device 202 and a first score 230 assigned to the client device 202 based in part on a current location of the client device 202, a time value, and/or the client device type (e.g., personal device, mobile device). For example, the client device 202 can include a noncompliant type, such as a personal device lacking certain security credentials, the client device 202 can be located outside an approved geo-location, and the time value of the request can be outside an approved time of day, resulting in the device 210 denying or blocking access to the first version 222 of the first application 220. The device 210 can permit partial access to a user of the client device 202 and/or the client device 202 access to a second version 222 of the first application 220 using the context 234 of the user, context 234 of the client device 202 and a second score 230 assigned to the client device 202 based in part on a current location of the client device 202, a time value, and/or the client device type (e.g., personal device, mobile device). For example, the client device 202 can include a noncompliant type, such as a personal device lacking certain security credentials, and the device 210 can permit a limited level (e.g., restricted shared drives) of access to the second version 222 of the application 220. The device 210 can permit access (e.g., full access) to a user of the client device 202 and/or the client device 202 access to a third version 222 of the first application 220 using the context 234 of the user, context 234 of the client device 202 and a third score 230 assigned to the client device 202 based in part on a current location of the client device 202, a time value, and/or the client device type (e.g., work device, work approved mobile device). The first score 230 can be different from the second score 230 and third score 230 and the second score 230 can be different than the third score 230.

In some embodiments, the device 210 can execute rules or controls to manage a client device 202 responsive to the client device 202 connecting to the device 210. For example, if the client device 202 is mobile device managed (MDM), the device 210 can provide rules or use the contextual analysis to prevent or block the launch of a local application 220 through the client device 202, based in part on a comparison (e.g., contextual analysis) of the context 234 of the user in view of the attributes 224 of the native version 222 of the requested application 220. The device 210 can use or execute per-application controls (e.g., per-application VPN controls) and/or container-local controls, for example, to block or prevent the launching of an application 220 is the user of the client device 202 and/or the client device 202 is assigned a score 230 less than a contextual access threshold 232 and therefore, does not meet a contextual access threshold 232. In embodiments, the device 210 can block or prevent the launching of a version 222 of an application 220 in response to an authentication or login credentials received from a user of the client device 202 and/or the client device 202. For example, the device 210 can perform a contextual analysis and generate a score 230 less than a contextual access threshold 232 if the user and/or client device 202 is not authorized to access the respective version 222 of the application 220. For example, the device 210 can or block a connection from the client device 202 to the requested version 222 of the application. The device 210 can fail to provide a URL associated with the requested version 222 of the application 220 to the client device 202. The device 210 can provide criteria to the client device 202 indicating that access to the requested version 222 of the application 220 is denied. For example, in one embodiment, the criteria can indicate that the user does not have proper authorization to access the requested version 222 of the application 220.

Referring now to operation (324), and in some embodiments, a version can be selected. The device 210 can select, using the identifier 209, a version 222 of the application 220 according to at least one of a context 234 of the user and an attribute 224 of the client device. For example, the device 210 can select at least one version 222 of the requested application 220 to provide to the client device 202 responsive to the comparison performed using the at least one of the context 234 of the user and an attribute 224 of the client device. The device 210 can select, using the score 230, the version 222 of the application 220 from the plurality of versions 222 in which to launch the application 220. For example, the device 210 can compare the scores 230 of individual versions 222 of the application 220 to one another and select the version 222 having the greatest or highest score 230. The device 210 can compare the scores 230 of the versions 222 of the application 220 to one another and select the version 222 having a score indicating the client device 202 is permitted access or most suitable for a given context of the client device 202. In some embodiment, the scores 230 can indicate that the client device 202 is permitted access to multiple versions 222 of the application 220 and with different levels of access. The device 210 can select the version 222 that the client device 202 is permitted the greatest or highest level of access (e.g., full access, least restrictions), but this need not be the case for all instances.

In embodiments, the device 210 can compare the scores 230 to a threshold 232 to select the version 222 of the application 220. For example, a score 230 greater than the threshold 232 can indicate that a user and/or a client device 202 is permitted to access can access a version 222 of an application 220 and a score 230 less than the threshold 232 can indicate that a user and/or client device 202 is denied or blocked access to a version 222 of an application 220. The device 210 can select the version 222 of the application 220 that has a score greater than the threshold 232. In embodiments, having multiple versions 222 with scores 230 greater than the threshold 232, the device 210 can select at least one version 222 of the multiple versions 222 with scores 230 greater than the threshold 232 based in part on the score 230 and a level of access indicated by the score 230.

Referring now to operation (326), and in some embodiments, the version can be provided. The device 210 can provide the client device 202 with access to the selected version 222 of the application 220, for example, so as to enable the client device 202 to launch a version 222 of the application 220 compatible with at least one of a context 234 and an attribute 224. The device 210 can provide the version 222 of the requested application 220 to the client device 202 and the client device 202 can launch or activate the version 222 of the application 220. For example, the device 210 can provide the client device 202 with a URL of the selected version 222 of the application 220, so as to enable the client device 202 to launch the version 222 of the application 220 compatible with the context 234. In some embodiments, a user can select or otherwise interact with the provided URL through the client device 202 to launch or activate the version 222 of the application 220 compatible with the context 234. The URL can include, but is not limited to, a URL for a hosted version 222 of an application, a URL for a SaaS version 222 of an application 220, or a URL for a local version 222 (e.g., locally installed on client device 202) of an application 220.

In some embodiments, the device 210 can provide access to the version 222 of the application 220 through a client application executing on the client device 202 and launch or activate the version 222 of the application 220 through the client application. The device 210 can provide a URL corresponding to the selected version 222 of the application 220 and the client device 202 can launch or activate the version 222 of the application 220 responsive to a user interaction (e.g., selection, click-on) with the URL through the client application.

The device 210 can generate and provide an indication to the client device indicating one or more criteria used in the selection of the version 222 of the application 220. For example, the device 210 provide criteria indicating why the user of the client device 202 and/or the client device 202 was permitted access to one or more versions 222 of the application 220 and/or criteria indicating why the user of the client device 202, criteria indicating why the user of the client device 202 and/or the client device 202 was permitted partial access to one or more versions 222 of the application 220 and/or the client device 202 was denied access to one or more versions 222 of the application 220. For example, in embodiments, the criteria can indicate that the user is permitted access to a version 222 of the application 220 based in part on the user of the client device 202 having an appropriate authorization level, the client device 202 being a compliant type of device (e.g., includes required security credentials, security protections), the client device 202 is within an approved geo-location and/or the request 2108 was received within an approved time range.

In some embodiments the criteria can indicate why the user of the client device 202 and/or the client device 202 is denied access to one or more versions 222 of the application 220. For example, in one embodiment, the criteria can indicate that the user does not have proper authorization to access at least one version 222 of the application 220, the client device 202 is a non-compliant type of device (e.g., lacking security credentials, security protections), the client device 202 is outside an approved geo-location and/or the request 2108 was received outside an approved time range. The device 210 can include in the criteria steps or actions the user of the client device 202 and/or the client device 202 can perform to receive permission to access a currently blocked version 222 of the application 220 (e.g., change client device, move to a different location). In embodiments, the device 210 can provide a window or graphical user interface to the client device 202 to display the selection criteria to a user of the client device 202. In some embodiments, the device 210 can generate a window or graphical user interface to display the criteria to a user of the client device 202 through a client application executing on the client device 202.

In some embodiments, the device 210 can detect a change in a context 234 of a user and dynamically modify the available versions 222 of the application 220. For example, the device 210 can receive a second or subsequent request 208 from the client device 202. The request 208 can indicate a change in the context 234 of the user. In embodiments, the request 208 can indicate, but is not limited to, that the client device 202 moved to a second or subsequent location within an approved geo-location for one or more versions 222 of the applications, a change to a secure connection between the client device 202 and the device 210 and/or the second request 208 is received within an approved time range (e.g., approved time of day). The device 210 can dynamically modify the available versions 222 of the requested application 220 in response to the second request 208. In some embodiments, the device 210 can provide an indication (e.g., message, pop-up) to the client device 202 to alter the user that the type and/or number of available versions 222 of the requested application 220 has been modified or to indicate one or more versions 222 added to the available versions 222 of the application 220 in response to the second request 208.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422.

The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering.

The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they're looking for.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
communicating, by a client device to a remote computing device, a request from a user to access an application, the request including an identifier to indicate that multiple versions of the application are accessible to the user;
receiving, by the client device, identification of a version of the application selected from the multiple versions of the application by the remote computing device based at least on the version of the application being compatible with one or more properties of the client device; and
providing, by the client device responsive to the request, access to the version of the application.

2. The method of claim 1, wherein the multiple versions of the application include two or more of the following: the version of the application being hosted on the remote computing device, the version of the application being installed locally on the client device or the version of the application being provided as a service.

3. The method of claim 1, further comprising receiving, by the client device, the request from an interaction by the user with a graphical representation of the application, the graphical representation associated with the multiple versions of the application.

4. The method of claim 1, wherein the one or more properties of the client device includes one or more of the following: a location of the client device, a connection of the client device, a network of the client device, a security information about the client device and an authorization or security level of the client device.

5. The method of claim 1, further comprising launching, by the client device, the version of the application to provide access to the version of the application.

6. A method comprising:
communicating, by a client device to a remote computing device, a request from a user to access an application, the request including an identifier to indicate that multiple versions of the application are accessible to the user;
receiving, by the client device, identification of a version of the application selected from the multiple versions of the application by the remote computing device based at least on the version of the application being compatible with one or more attributes of the user of the client device; and
providing, by the client device responsive to the request, access to the version of the application.

7. The method of claim 6, wherein the multiple versions of the application include two or more of the following: the version of the application being hosted on the remote computing device, the version of the application being installed locally on the client device or the version of the application being provided as a service.

8. The method of claim 6, further comprising receiving, by the client device, the request from an interaction by the user with a graphical representation of the application, the graphical representation associated with the multiple versions of the application.

9. The method of claim 6, wherein the one or more attributes of the user includes one or more of the following: a location of the user, a profile of the user, the client device being used by the user, a time of day or a risk score of the user.

10. The method of claim 6, further comprising launching, by the client device, the version of the application to provide access to the version of the application.

11. A system comprising:
a client device, comprising one or more processors and memory, configured to:

communicate to a server a request from a user to access an application, the request including an identifier to indicate that a plurality versions of the application are available to the user, a version of the plurality of versions of the application being provided by a remote computing device;

receive, from the server, identification of the version of the application provided on the remote computing device based at least on the version of the application being compatible with one or more properties of the client device; and cause, responsive to the request, access to a uniform resource locator (URL) of the version of the application provided by the remote computing device.

12. The system of claim 11, wherein the plurality of versions of the application include another version of the application being installed locally on the client device.

13. The system of claim 11, wherein the client device is further configured to receive identification of the version of the application provided on the remote computing device instead of another version of the application being installed locally on the client device.

14. The system of claim 11, wherein the version of the application provided by the remote computing device is hosted by the remote computing device.

15. The system of claim 11, wherein the version of the application provided by the remote computing device is provided as a service by the remote computing device.

16. The system of claim 11, wherein the one or more properties of the client device includes one or more of the following: a location of the client device, a connection of the client device, a network of the client device, a security information about the client device and an authorization or security level of the client device.

17. A system comprising:
a client device, comprising one or more processors and memory, configured to:
communicate to a server a request from a user to access an application, the request including an identifier to indicate that multiple versions of the application are accessible to the user;
receive from the server identification of a version of the application selected from the multiple versions of the application by a remote computing device based at least on the version of the application being compatible with one or more attributes one of the user or the client device; and
cause, responsive to the request, access to the version of the application.

18. The system of claim 17, wherein the multiple versions of the application include two or more of the following: the version of the application being hosted on the remote computing device, the version of the application being installed locally on the client device or the version of the application being provided as a service.

19. The system of claim 17, wherein the one or more attributes of the client device includes one or more of the following: a location of the client device, a connection of the client device, a network of the client device, a security information about the client device and an authorization or security level of the client device.

20. The system of claim 17, wherein the one or more attributes of the user includes one or more of the following: a location of the user, a profile of the user, the client device being used by the user, a time of day or a risk score of the user.

* * * * *